United States Patent
Fink

(10) Patent No.: US 9,846,251 B2
(45) Date of Patent: Dec. 19, 2017

(54) ELECTRO-HYDRO-DYNAMIC IDENTIFICATION OF A SUBSURFACE FLUID FLOW

(71) Applicant: James Brewster Fink, Tucson, AZ (US)

(72) Inventor: James Brewster Fink, Tucson, AZ (US)

(*) Notice: Subject to any disclaimer, the term of this patent is extended or adjusted under 35 U.S.C. 154(b) by 0 days.

(21) Appl. No.: 15/491,113

(22) Filed: Apr. 19, 2017

(65) Prior Publication Data

US 2017/0315251 A1    Nov. 2, 2017

Related U.S. Application Data

(60) Provisional application No. 62/328,128, filed on Apr. 27, 2016.

(51) Int. Cl.
| | | |
|---|---|---|
| *G01V 3/20* | (2006.01) | |
| *G01V 3/02* | (2006.01) | |
| *G01F 1/64* | (2006.01) | |

(52) U.S. Cl.
CPC .    *G01V 3/02* (2013.01); *G01F 1/64* (2013.01)

(58) Field of Classification Search
CPC .................................. G01V 3/02; G01F 1/64
USPC ................................................ 324/324, 353
See application file for complete search history.

(56) References Cited

U.S. PATENT DOCUMENTS

| | | | | |
|---|---|---|---|---|
| 2,625,374 A * | 1/1953 | Neuman | ............... | E21B 47/102 175/50 |
| 4,882,542 A * | 11/1989 | Vail, III | ................. | G01V 11/00 324/368 |
| 7,259,564 B2 * | 8/2007 | Ligneul | ................. | E21B 47/042 324/337 |
| 8,030,937 B2 * | 10/2011 | Hu | ........................... | G01V 3/24 324/366 |
| 8,931,553 B2 * | 1/2015 | Cannan | .................... | E21B 43/25 166/250.01 |
| 2001/0030539 A1 * | 10/2001 | Montgomery | ........... | G01V 9/02 324/324 |
| 2011/0184711 A1 * | 7/2011 | Altman | ................. | E21B 49/005 703/10 |
| 2015/0204996 A1 * | 7/2015 | Dashevsky | ............. | E21B 43/20 324/324 |

* cited by examiner

*Primary Examiner* — Jay Patidar
(74) *Attorney, Agent, or Firm* — Yakov S. Sidorin; Quarles & Brady LLP

(57) ABSTRACT

Methodology for detecting and monitoring the propagation of a volume of liquefied material underground without measuring the resistivity of the ground. Liquefied material is charged by injecting current through electrically-conducting member in contact with the material to form a spatial distribution of electric potential underground. Measuring time-dependent change of such spatial distribution caused by movement of liquefied material and associated with propagation of a Gaussian surface of electrical charge associated with the outer surface and/or the front of the volume is detected with a system of electrodes to determine a time of arrival of liquefied material to target location.

20 Claims, 9 Drawing Sheets

ELECTRO-HYDRO-DYNAMIC IDENTIFICATION OF A SUBSURFACE FLUID FLOW

CROSS-REFERENCE TO RELATED APPLICATIONS

This application claims priority form and benefit of U.S. Provisional Patent Application No. 62/328,128 titled "Electrohydrodynamic identification of a subsurface fluid flow" and filed on Apr. 27, 2016. The disclosure of this provisional patent application is incorporated herein by reference.

TECHNICAL FIELD

The present disclosure generally relates to monitoring a flow of fluid underground, and more particularly to monitoring rate and/or direction of a flow of the underground fluid by measuring (below, near, or at a ground surface) changes occurring in the induced electric fields corresponding to the body of such fluid.

BACKGROUND

The need to monitor movement of fluids underground arises in different circumstances. One non-limiting example of such circumstances includes enhanced oil recovery (EOR), where fluid(s) is/are injected into the ground to either reduce the viscosity of and/or push the oil towards the extraction (production) wells. Examples of the injected-fluid based methodologies include what's referred to as waterflooding, $CO_2$ flooding, steam-assisted gravity drainage or SAGD, cyclic steam stimulation (CSS or huff-and-puff), aquifer recharge, in-situ recovery of minerals, to name just a few. And yet the related art appears to be silent with respect to methods enabling the user to directly, in real time detect and monitor the movement of fluids at typical reservoir or aquifer depths. Indeed, a major not-yet-addressed challenge remaining in related art is to detect fluid flow and direction long before it reaches the extraction well, and to monitor such movement of the detected fluid with ease and without impediments throughout the entirety of its propagation from an injection well to an extraction or monitoring well, so as to avoid, for example, unnecessary contaminations of the areas neighboring or present at the path of the fluid propagation underground. Methods of the fluid-movement monitoring proposed by Dasgupta in U.S. Pat. No. 8,041,510, for example, are rather complex, because these methods—as claimed by Dasgupta—while relying on the use of microseismic approach (which allows for the detection of fractures in the ground as they occur as a result of, for example, hydraulic-fracturing, or detection of changes in the reservoir chamber as a result of absence of oil, or increase in water content), nevertheless require the presence of acoustic "noise" produced by the fluid flow to detect the movement of the fluid. Such requirement inevitably limits the applicability of the Dasgupta's methods, as a fluid flow in unrestricted or minimally-restricted areas of the ground is simply unlikely to produce to produce a seismic signal, thereby rendering this method practically ineffective. Related art also references another method, according to which chemical tracers are added to the injected fluid, followed by physical/chemical determination of the presence of such tracers at a chosen point of observation, such as a monitoring well. Understandably, such method can only be of use if and when the tracers finally arrive at a production or monitoring well. At the same time, this method cannot facilitate at all the detection of the fluid movement prior to tracer arrival, and the inference of the direction (or vector) of the fluid movement can be based only on the tangible observation of proportional arrival of tracers at multiple monitoring wells.

Therefore, there remains a need in methodology facilitating the observation of the movement of fluid underground (with a determination of both speed and direction) in real time, which could afford the user to anticipate and/or predict the arrival of the fluid to a chosen reference location.

SUMMARY

Embodiments of the invention provide a method for determining a dynamic characteristic of a liquefied and energize material propagating underground. One embodiment provides a method that includes identifying a first array of electrically-conducting members each of which is disposed in electrical contact with the ground and identifying a target location at the ground, the target location separated from the first array. The method further includes injecting current, into an ambient medium surrounding a transmitting member of the first array, through the transmitting member of the first array to form a first spatial distribution of electric potentials at the ambient medium. The method additionally includes measuring a time-dependent change of the first spatial distribution (which change occurs due to a movement of the ambient medium), with a sensing electrically-conducting member of the first array to determine, prior to an actual arrival of said ambient medium to the target location, a time of such actual arrival. The measuring of such time-dependent change can also be effectuated with a second array of electrically conducting members. (In a specific case, such second array includes an array of point electrically-conducting members distributed at the ground surface.) The ambient medium can be formed by liquefied and electrically-energized material present or delivered underground. In a specific implementation, the method may further include the steps of (i) electrically-deactivating the transmitting member; (ii) injecting current, into the ambient medium surrounding another member electrically-conducting member of the first array, through such another member to form a second spatial distribution of electric potentials at said ambient medium; and (iii) measuring a time-dependent change of the second spatial distribution (which change occurs to the movement of the ambient medium) by measuring a voltage between any two electrically-conducting members from the first array, where these any two members do not include the another member through which the current is being injected. Additionally, as part of the mapping, a visually-perceivable map (such as one presented with an image or a plot or a listing) of movement of the ambient medium as a function of time can be formed. Such map is created for a mapping timer period that is a sub-set of (that is, is included in) an operational time period that may range from a moment of time preceding the beginning of injection of current underground to the moment of time of actual arrival of the ambient medium to a chosen target location.

A related embodiment provide a method that includes identifying a reference electrically-conducting member disposed in electrical contact with a ground and identifying a target location at the ground. The method further includes determining a spatial coordination between the reference electrically-conducting member and a first array of electrically-conducting members each of which is disposed in electrical contact with the ground. The method also includes injecting current, into an ambient medium surrounding the reference electrically-conducting member, through the reference electrically-conducting member to form a spatial distribution of electric potentials in the ambient medium; and measuring a time-dependent change of said spatial distribution, occurring due to a movement of the ambient medium, with an measurement electrically-conducting member of an array of measurement electrically-conductive members to determine a time of an actual arrival of the ambient medium to the target location prior to said actual arrival. The ambient medium can be formed by liquefied and electrically-energized material present or delivered underground. In a specific implementation, based on the measurement, a visually-perceivable spatial map of the movement of the ambient medium towards the target location can be created as a function of time.

A predetermined electrical current is directly imposed on/injected into a solution/fluid that is being delivered underground (for example, to the aquifer or underground reservoir) and that forms (with or without being mixed with the reservoir contents) a body of underground fluid. Such direct electrification causes a measurable electrical potential field associated with electrical charges located at the outer boundary of the fluid's volume in the sense of a Gaussian surface. An array of sensing electrodes is used to measure the potential at each electrode's location and monitor temporal changes in the potential field that result from environmental variations without the measuring the resistivity of the soil. Based on these changes, the propagation of the body of underground fluid is detected and measured.

The voltage measured at each of the plurality of electrodes in the sensing array is continuously monitored and plotted as a function of time to identify the rate of propagation and/or change of the electric field associated with the statically-charged fluid underground. The non-zero flow rate produces a corresponding change in the voltage measured at each electrode site. While the voltage may increase or decrease, such change is registered at all sensing electrode locations. It was discovered that the rate of propagation of the electric field is directly proportional to the rate at which the fluid flow is moving, and that the manner in which such electric field responds to injections is indicative of how the fluid underground is entering the formation. It was also discovered that the overall response of the electrical field associated with the fluid volume formed underground is a proxy for measuring the volume of solution injected through the well(s).

Notably, as a person of skill in the art will readily appreciate, the method of the invention can be expressly carried out in any of the two following forms: either a) the injection of current is performed through an electrode that is in physical contact with the underground fluid while measurement of changes in the Gaussian surface (representing the distribution of electrical charges formed underground as a result of such injection) is carried out with an electrode that is not in physical contact with the underground fluid, or b) the injection of current is performed through an electrode that is not in physical contact with underground fluid while measurement of changes in the Gaussian surface is carried out with an electrode that is in physical contact with underground fluid.

BRIEF DESCRIPTION OF THE DRAWINGS

The invention will be more fully understood by referring to the following Detailed Description in conjunction with the generally not-to-scale Drawings,of which.

Figure 2A:
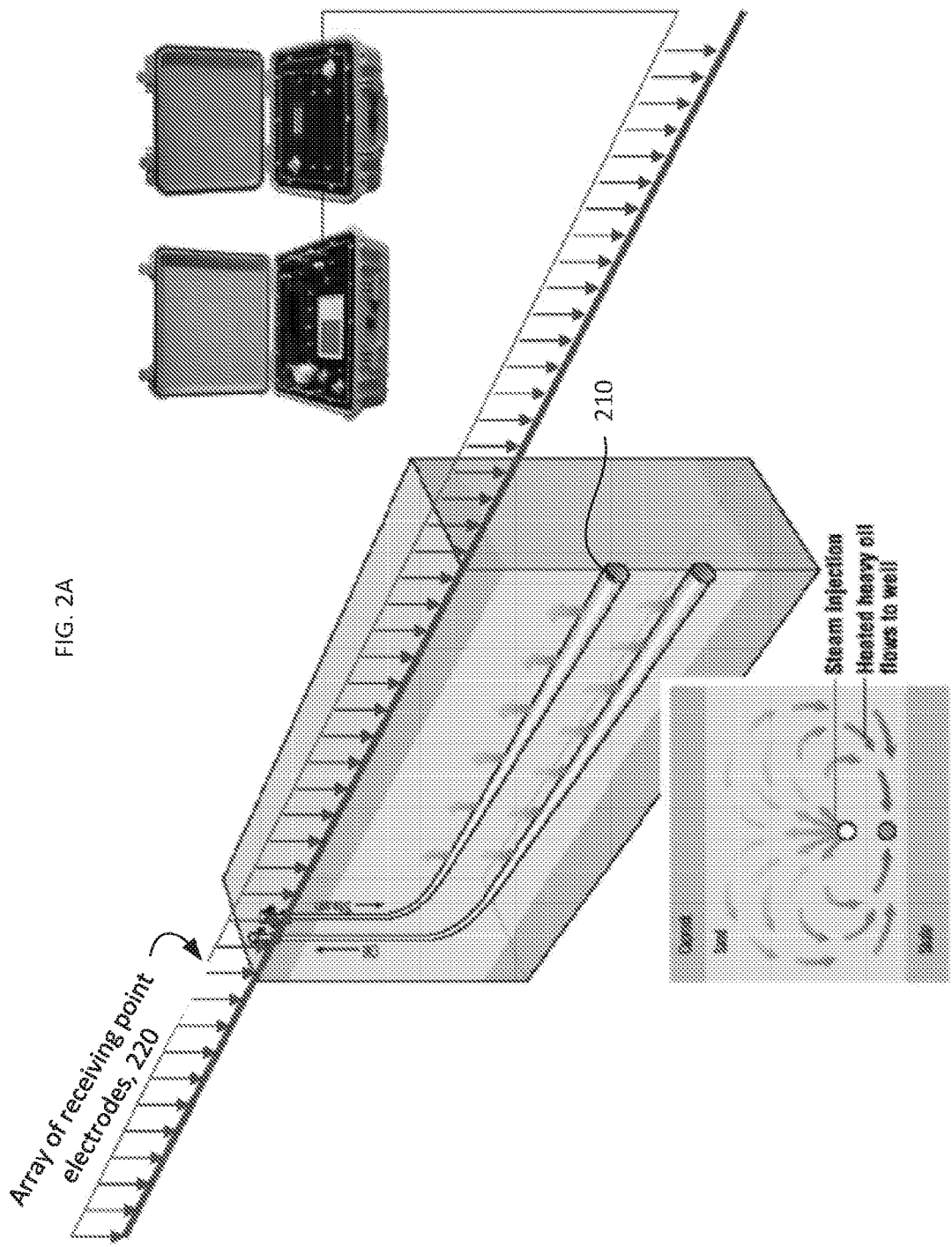
FIGS. 2A is a schematic diagram illustrating a process of detection of the spatial propagation of the electrical charge formed at a front of the volume of liquefied material underground, according to an embodiment of the invention, with a linear array of the point surface sensors.
Figure 2B:
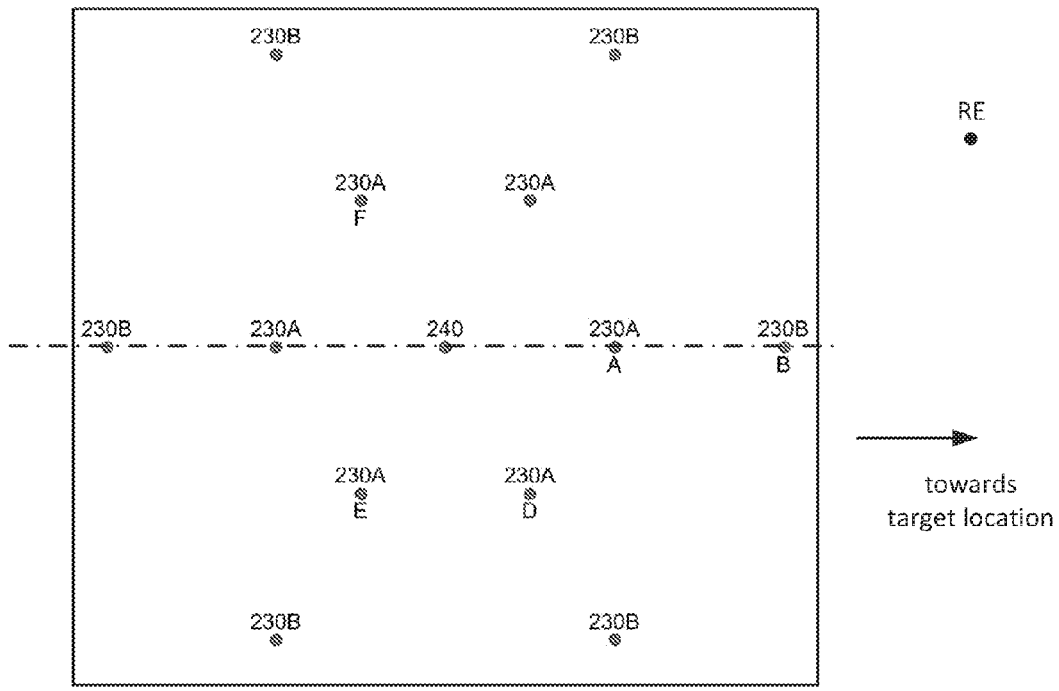
FIG. 2B is a schematic diagram illustrating a process of detection of the spatial propagation of the electrical charge formed at a front of the volume of liquefied material underground, according to an embodiment of the invention, with a 2D array of the point surface sensors.
Figure 3A:
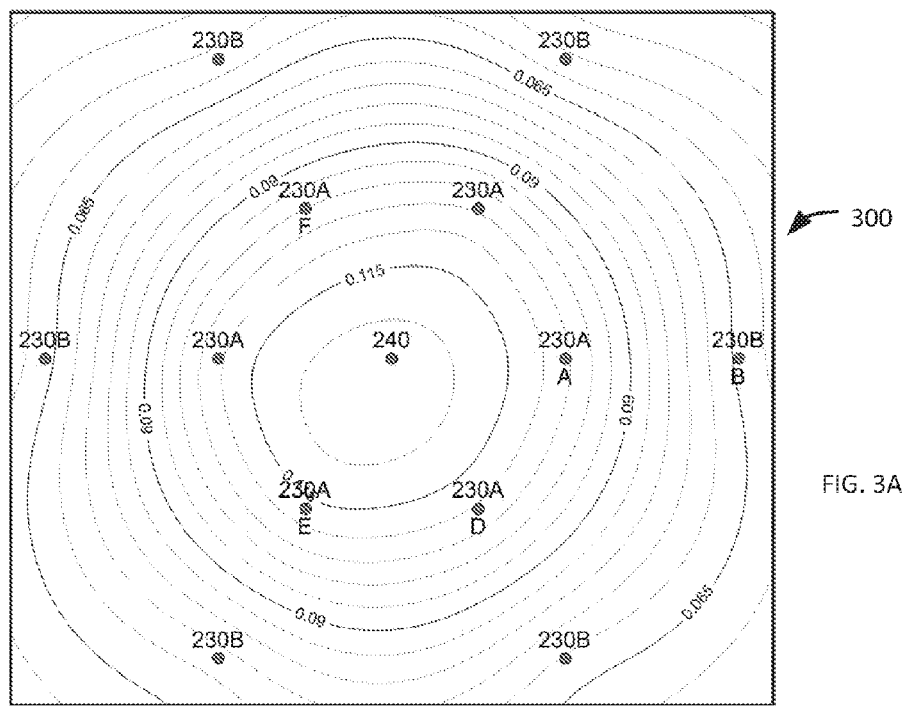
Figure 3B:
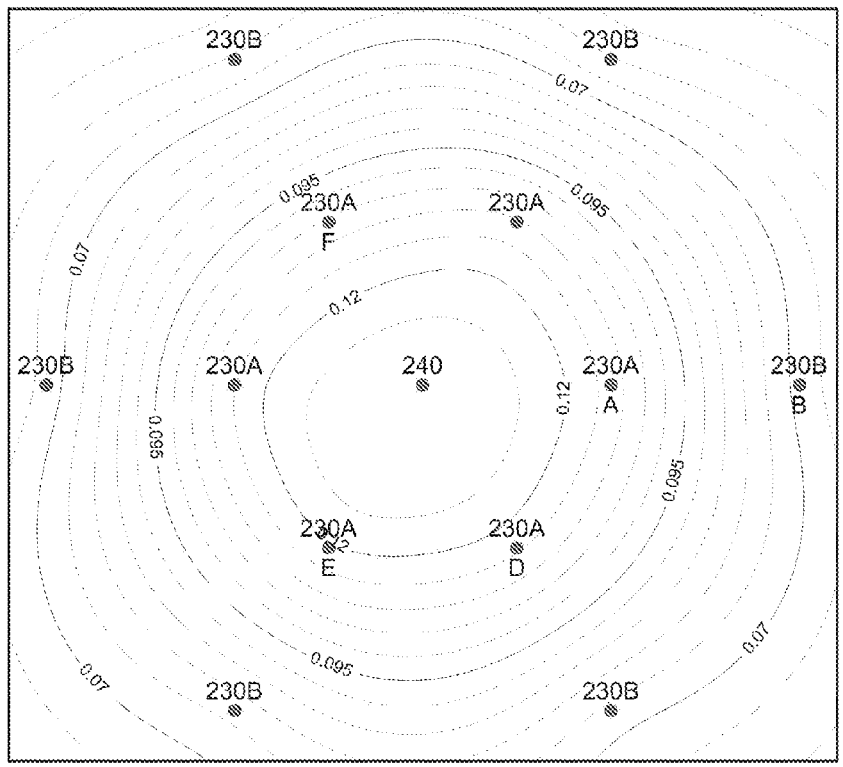
Figure 3C:
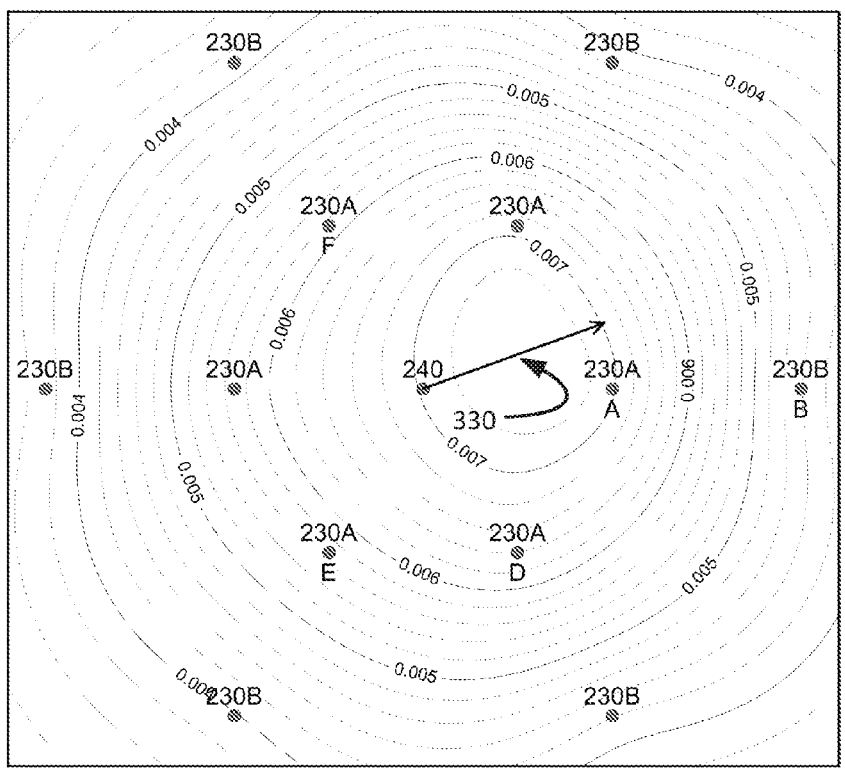
Figure 4A:
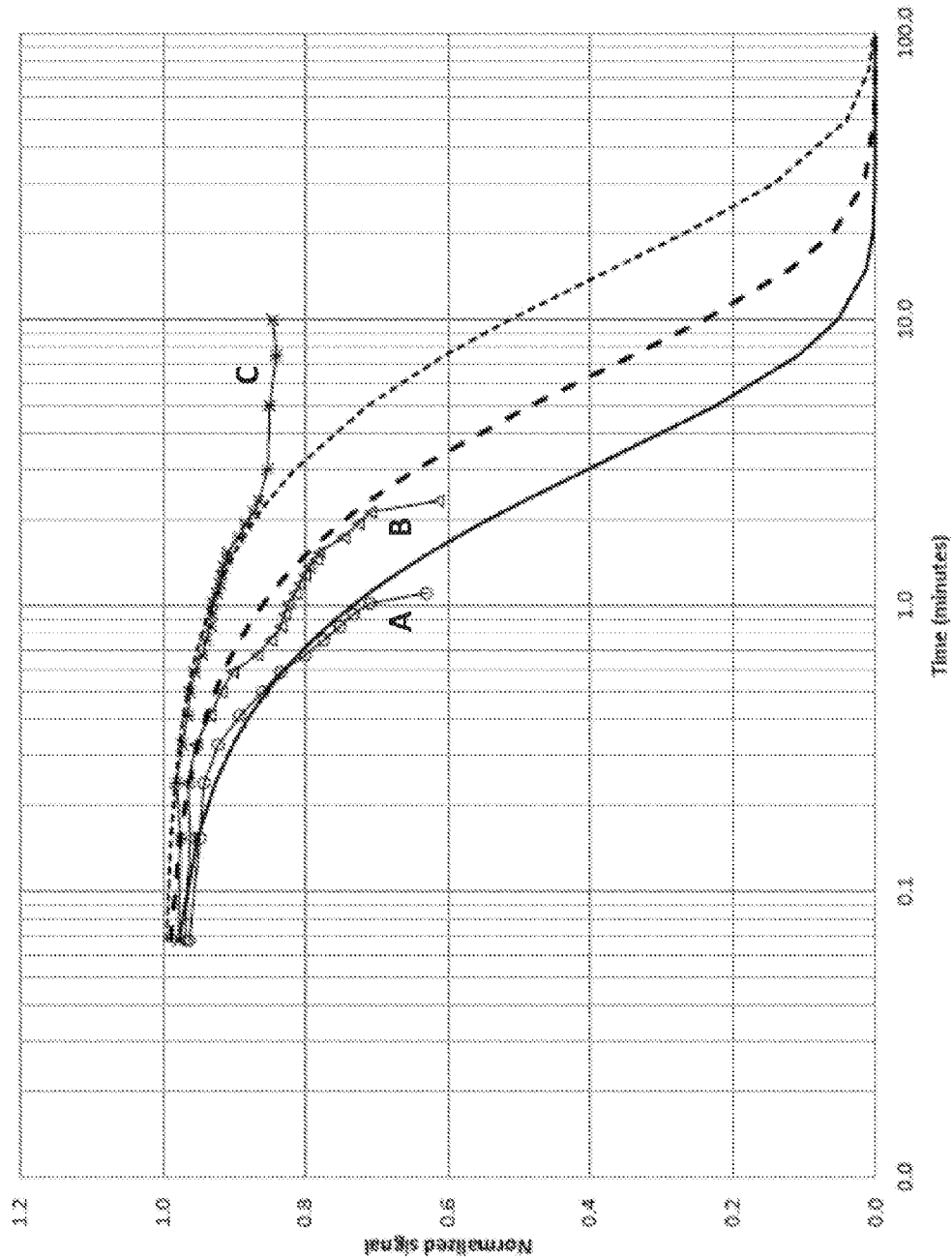
Figure 4B:
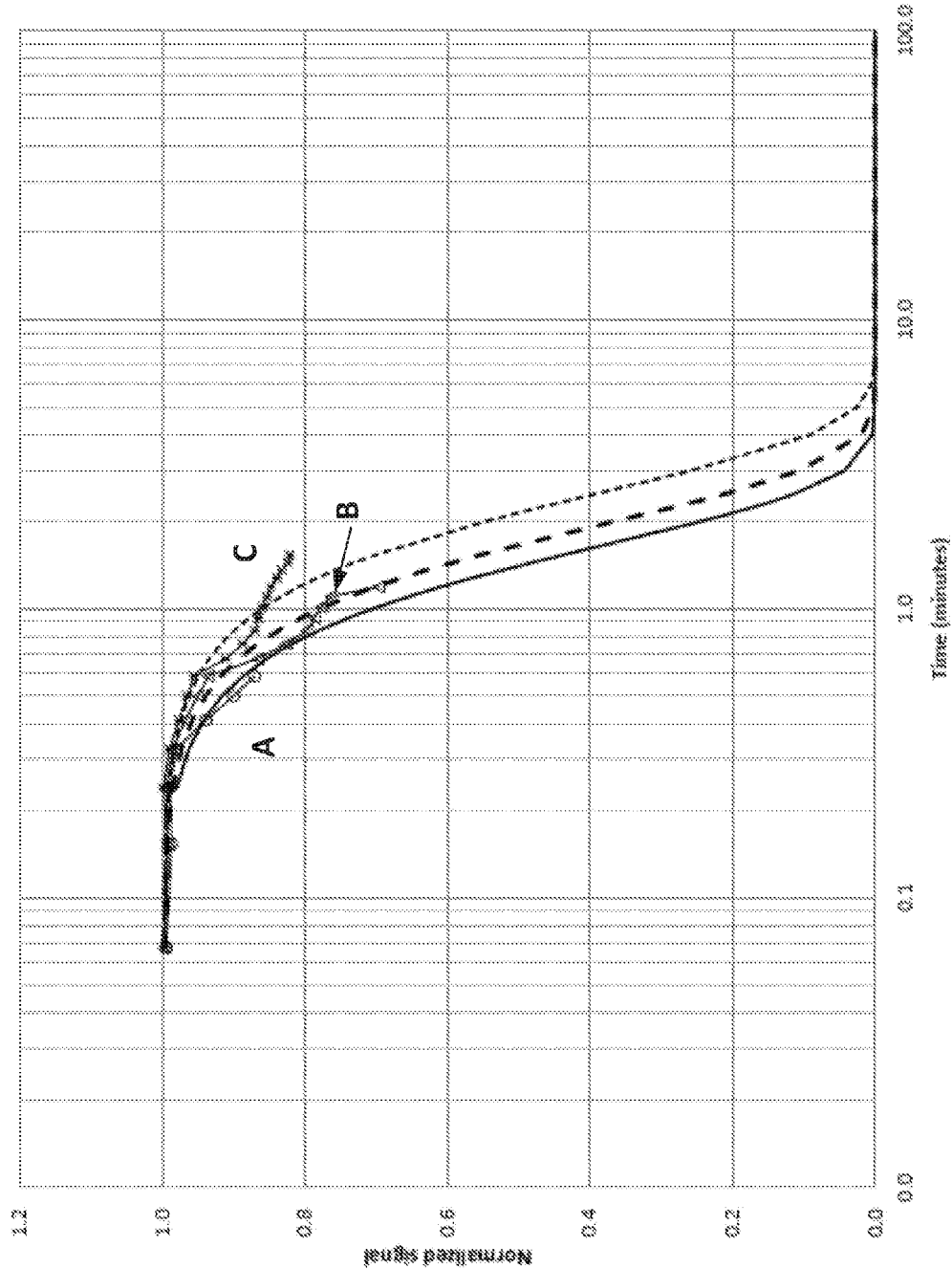
Figure 5:
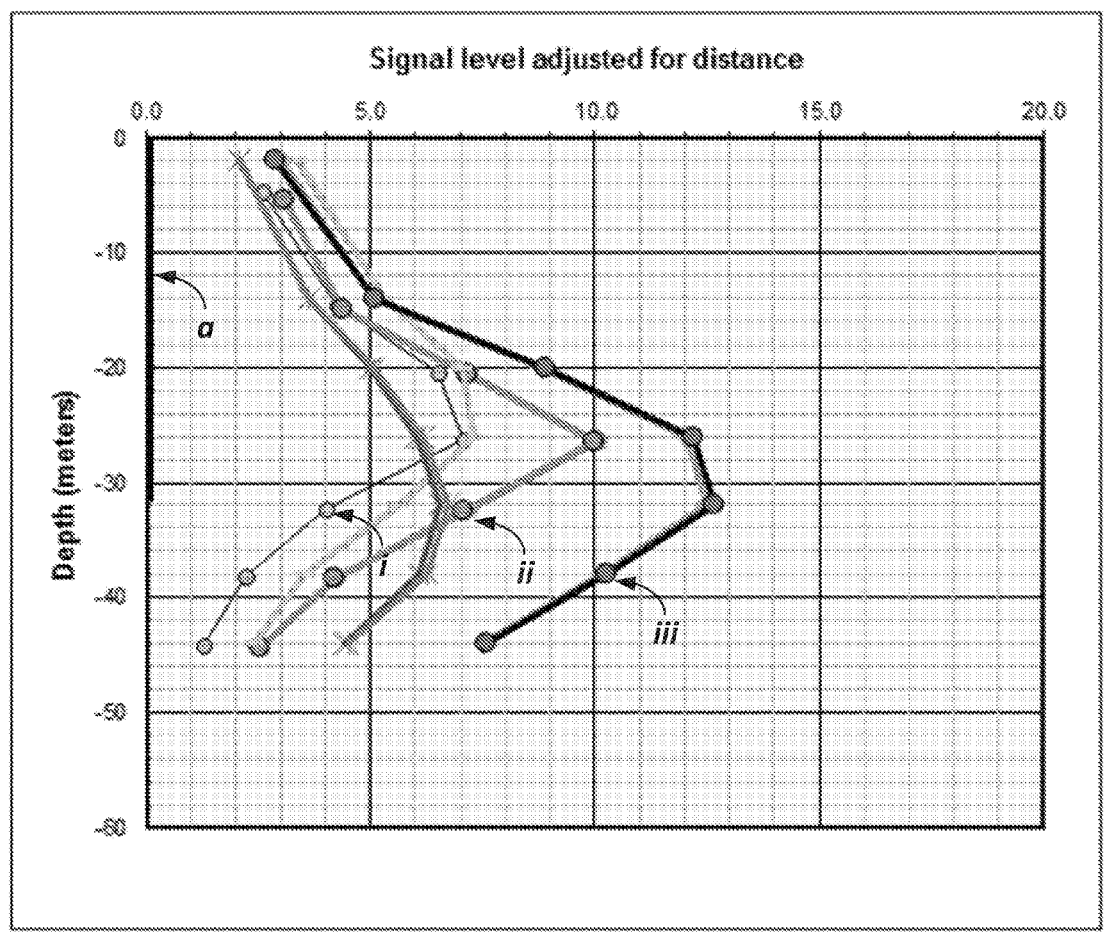
Figure 6:
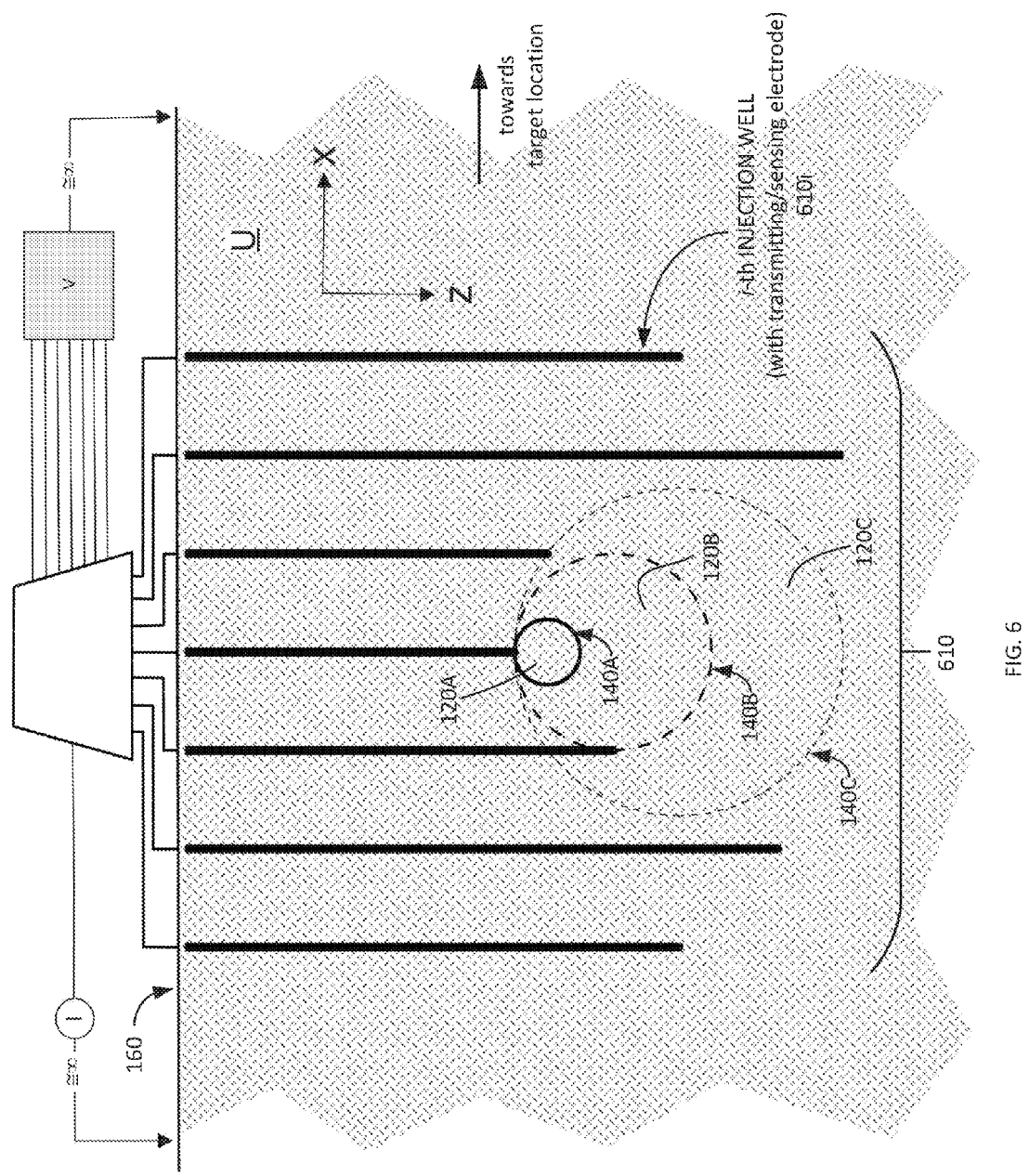

FIGS, 3A, 3B, 3C provide plots illustrating the spatial distribution of E-field associated with the volume of liquefied material underground before the injection of fluid (FIG. 3A), after the injection of the specified amount of the fluid (FIG. 3B), and the change of the distribution with time (FIG. 3C);

FIGS. 4A and 4B present plots of the results of measurement of electric field defined by the Gaussian sphere of the expanding and/or moving volume of liquefied-and-energized fluid with specific electrodes of the electrode grid of FIG. 2B;

FIG. 5 contains plots of data acquired with the use of a related methodology and associated with electrical potential next to steel well casings;

FIG. 6 provides a schematic illustration to a related implementation of the process of sensing the electrical potential associated with a surface of the electrical charges on the volume of spatially-propagating electrified liquefied material. formed underground.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Embodiments of the invention solve a problem of operationally unimpeded real-time detection and continuous monitoring of a fluid flow at depths typical for underground reservoirs, aquifers and in-situ recovery projects by injecting electric current directly into an underground fluid, (used to, for example, facilitate the process of extraction of oil as a result of hydraulic fracturing), and monitoring the temporal changes in an electric field associated with the front of the expanding volume of such fluid to determine substantially instantaneously at least one of the speed and direction of flow of the fluid underground before the propagating fluid physically reaches a given point underground. In particular, a solution is provided for rapidly identifying the occurrence of a movement of an underground fluid and for estimating the rate and direction of such movement based on monitoring such temporal changes in time at a fixed spatial location. The implementation of the idea of the invention includes a method for using parameterized E-field data to detect and quantify subsurface fluid flow.

For the purposes of this disclosure and associated claims and unless expressly stated otherwise, a "real-time" performance of a system is understood as performance that is subject to operational deadlines from a given event to a system's response to that event. For example, a real-time extraction of specified information (e.g., reading of data representing a tangible physical characteristic of a target or sample under test such as, for example, voltage) from a measurement system (such as a voltmeter) may be one triggered by the user and executed simultaneously with and without interruption of (i) a process of measurement during which such data have been recorded, and/or (ii) a process of change of the tangible physical characteristic.

The idea of the present invention (which is referred to hereinafter as an "electro-hydro-dynamic", or EHD, methodology) stems from the realization that (a) a volume of liquefied material or fluid positioned underground (such as water, for example) and energized by the directly-injected-into-such-fluid electrical current as a result of conversion of electronic conduction to ionic conduction, forms a Gaussian surface of electric charge distribution, in which the majority of the electric charges reside on the outer edge(s) of the volume of the so liquefied/electrified material or fluid, and that (b) the variations and changes to such Gaussian surface cause the variation of the distribution of electric field in the ambient medium and/or high-ionic-strength-phase in front of such liquefied/electrified material or fluid.

For the purposes of this disclosure, liquefied and electrically energized material is defined as any liquid material placed underground that has ionic content different from that of the medium/(a) surrounding such material. In one example, the liquefied and electrically energized material is a liquid characterized by the distribution of free electron charges that has higher contrast as compared to the distribution of free electron charges in the medium hosting this liquid.

As the fluid placed underground flows (expands) into the ambient medium, the Gaussian surface changes spatially, together with the leading edges of the volume occupied by the liquefied/electrified material. The surrounding electric field (the E-field) is then monitored by a separate set of electrodes in various configurations. It is appreciated that none of the methodologies discussed to date in related art offers and/or facilitates the observation, measurement, or determination of a parameter associated with the spatial movement of the front of the fluid until the flow of fluid actually physically arrives at an actual target location, let alone the observation and/or measurement of changes in electrical potential and/or charges associated with such movement. In other words, the implementations of the inventions address the need in a real-time measurement.

It is appreciated that the variation in grounding characteristics of an injection well contributes to the observed signal. For example, when a well is steel-cased, the presence of metal affects the results. Here, for example, adding some fluid solution to a well will cause fluid to rise up in the gap between the casing and the ground into which such cases has been disposed (the gap often having an annular cross-section) which, in turn, changes the casing-to-ground contact and therefore changes (usually improves) the electrical grounding characteristics of the well. In cases where there is no ionic content difference between the injected fluid and the host medium this alone will cause an observable and very useful signal. It is typically a significant component of the observed signal in many cases and should be addressed to some extent.

Figure 1A:
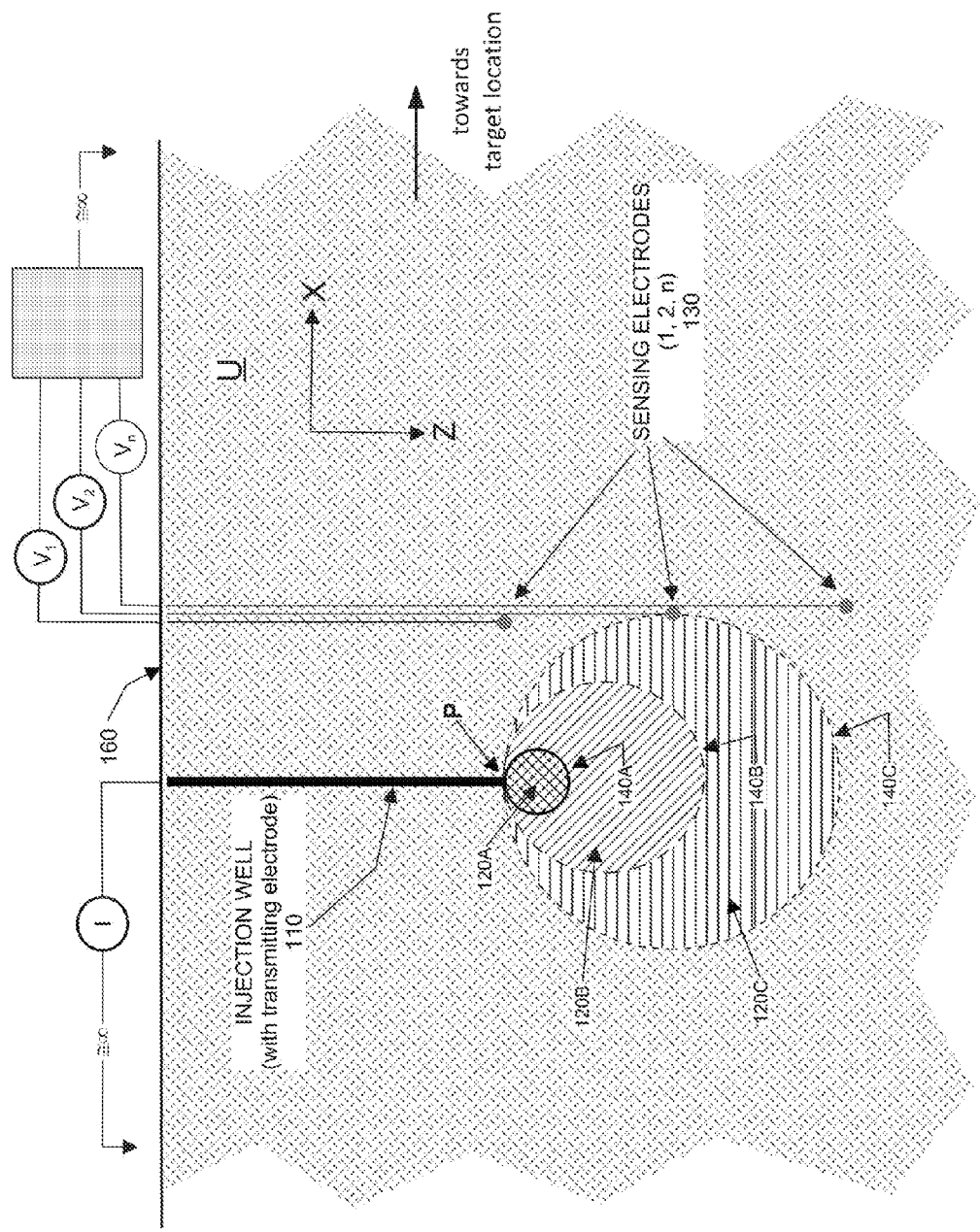
FIGS. 1A, 1B, 1C, and 1D provide schematic illustrations to the process of sensing the electrical potential associated with a surface of the electrical charges on the volume of spatially-propagating electrified liquefied material, formed underground according to an embodiment of the invention.
Figure 1B:
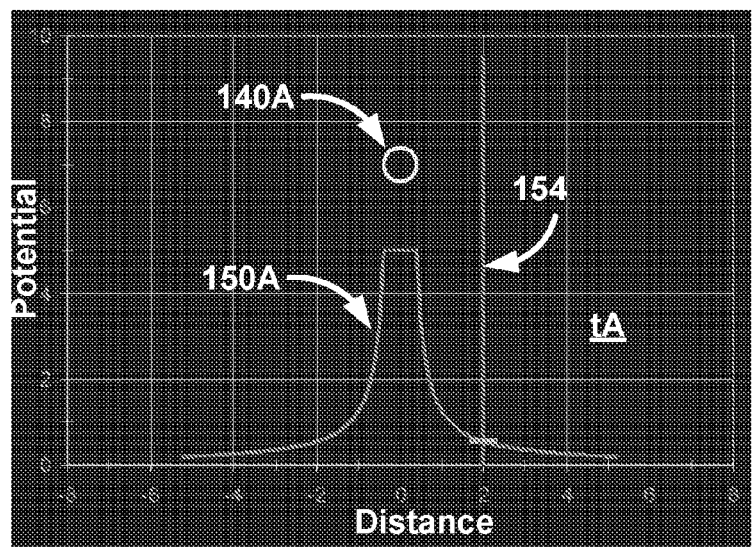
Figure 1C:
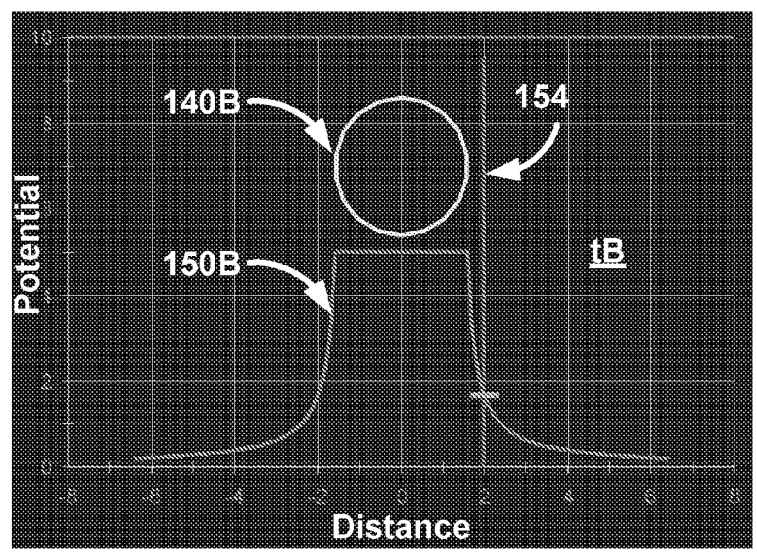
Figure 1D:
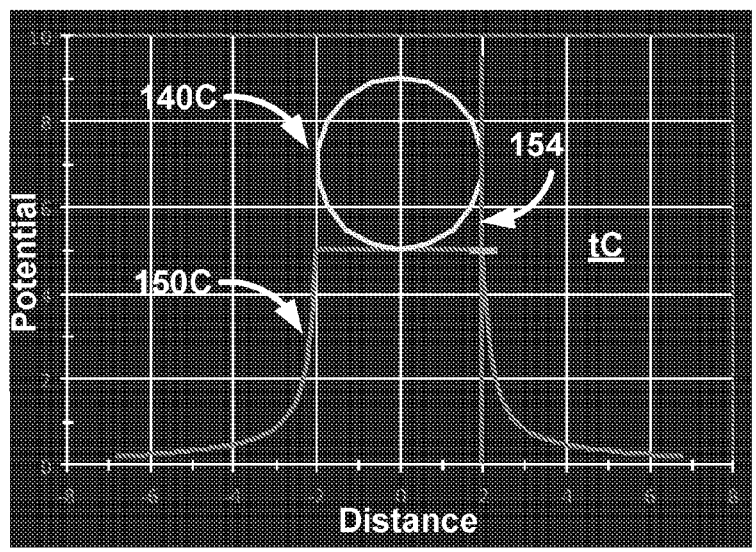

A non-limiting schematic example of the implementation of the proposed concept is illustrated in FIGS. 1A, 1B, 1C, and 1D. FIG. 1A shows (for simplicity—in profile or side view) the injection well 110, through which the chosen fluid solution is placed (via pumping or injection) underground U, forming (possibly in association with other material(s) such as oil present at the underground reservoir) the volume of liquefied material that spatially expands with time. The process of time-dependent volume expansion of the liquefied material is schematically indicated with the sequence of areas 120A, 120B, 120C encircled with the closed curves 140A, 140B, 140C. The closed curves 140A, 140B, 140C schematically illustrate the outer boundaries of the volumes 120A, 120B, 120C, respectively. The electric current I is directly injected into the liquefied material volume 120A, 120B, 120C with the use of an electrically-conducting member associated with the injection well (referred to as a transmitting electrode; not shown), to electrically energize the liquefied material placed underground. In one scenario, the transmitting electrode is placed in the injection well. A set of receiving electrodes (one of which is shown schematically as an underground electrode 130) is used as part of the electrical circuit (indicated but not shown in minute detail) to determine the spatial distribution of the electric field(s) on the surfaces of the now liquefied and energized material volumes as represented by the curves 140A, 140B, 140C via measuring a spatial distribution of electrical potential associated with the electric field and changes of such spatial distribution (from 150A to 150B to 150C, as shown in FIGS. 1B, 1C, 1D). In a specific case, the process of measuring a change of such electrical potential is effectuated in time at a predetermined fixed location (such as a location of a receiving electrode 130 that is illustrated in FIG. 1A and that is chosen from an optional array of such receiving electrodes that may be disposed at different spatial locations with respect to the location of the injection well 110).

While the volume of liquefied-and-energized material underground is shown in FIG. 1A as only expanding at the corresponding location, it is appreciated that, generally, this volume not only changes its dimensions and/or shape but under real condition is likely to be repositioning or moving through the earth (for example, laterally, along at least one of the axes x, and y; and/or depth-wise, along the z-axis as shown) with respect to the location of injection P, subject to changing ambient conditions. While shown being positioned underground, the set or array of return electrode(s) 130 can be a set disposed on the ground surface 160 (referred to as a set of surface electrodes), or a set including a combination of the underground- and surface-electrodes.

FIGS. 1B, IC, and ID schematically illustrate the temporally-changing spatial distribution of electrical potential (represented by curves 150A, 150B, 150C) as measured at times $t_A < t_B < t_C$ with the use of the receiving electrode 130 located at the position marked with the straight line 154. In reference to FIG. 1A, these "snap-shots" of the temporally-changing spatial distribution of electrical potential correspond to the time-dependent expansion of a Gaussian surface of free electric charges caused by the process of energizing of the liquefied material placed underground with the electrical current I as well as well-casing effects and electrokinetics.

According to one implementation of the invention, the process of determining a dynamic characteristic of moving fluid underground includes the interplay between the application of a known voltage and current to the first group of electrical conductors or electrodes (containing a selected electrical conductor and a first electrode from an array of electrodes) and measuring in real time a time-dependent change in a spatial distribution of electric potential (caused by such application and associated with the outer surface of the fluid underground) with the use of a second array of electrodes.

In different embodiments of the invention, the fluid underground may be electrified (energized) by electrifying a metallic well casing through which the fluid (generally, a pre-defined solution) is delivered to the underground reservoir or by positioning an electrically-conducting member directly into the fluid or electrifying the metallic well casing itself. While it is generally assumed that the solution (such as for example, formation water) contains sufficient ionic strength to support ionic conduction, it is appreciated that in order to achieve the described type of monitoring, such assumption is not required. Regardless of the precise way of energizing the solution, the achieved result is the same: the solution delivered to the reservoir is caused to be electrically charged due to conversion of electronic conduction to ionic conduction, the movement of solution in the earth generates an electrokinetic signal, and the possible change in the grounding characteristics of well casings due the filling of the annuli.

The means for assessing the potential field signal includes, in one implementation, a suitably electrically grounded metallic structure placed at a large distance from the area being investigated, such as a steel well casing, a pipeline, a cathodic protection ground, a steel foundation of a tower, or a surface electrode, or where a large distance is not achievable then by use of a geometrically understood more proximal grounded structure.

As may be used herein, the term "transmitting" refers to electrode(s) used to inject a known voltage and current directly into the fluid to establish the distribution of the potentials, while the term "receiving" refers to electrode(s) used to measure the voltage and located within the potential field in order to monitor variations produced by changes in the location and/or orientation of the fluid volume. It is appreciated that the solution can be injected under the surface through a plurality of injection wells (through the metallic casings or tubes associated with such wells, in which case the casings can serve as transmitting electrodes) and/or an electrical potential(s) can be measured either between a transmitting electrode associated with a given injection well and any of the receiving electrodes 130 (as shown in FIG. 1A) or between any pair formed by the first and second receiving electrodes in the subset of receiving electrodes. The subset of a group of electrodes is a combination of electrodes all elements of which are included in the group. It is also understood through the theorem of reciprocity that interchanging current and potential measuring pairs of electrodes will produce the same desired signal.

Alternatively, a group of underground electrically-conducting members that are not associated with an injection well can be used to establish spatial distribution of electrical potential at the underground area of interest, while the change in electrical field associated with the Gaussian surface of the liquefied material volume underground is monitored with a grid of receiving electrodes that forms completely different set of electrodes.

The underground electrically-conducting member(s) may be positioned ideally but not limited to substantially vertical positioning (as a transmitting electrode associated with the injection well of FIG. 1A); in one case, a member may extend substantially parallel to the ground surface 160, while in another specific case the receiving electrode(s) or sensor(s) may be "point sensors". Generally, the electrodes can be at any orientation. In some implementation the electrodes are disposed to be substantially parallel to one another in order to ensure the known separation between different portions of the electrodes. The term "substantially parallel" as used herein refers to the electrode the relevant portion of which is inclined with respect to the ground surface by no more than 40 degrees, preferably no more than 20 degrees, even more preferably by no more than 10 degrees, and most preferably by no more than 5 degrees.

The terms "point sensor" and "point electrode" refer to the electrode/sensor the dimensions of which are so small compared to the inter-electrode distances that such sensor can be treated as a point, as understood in the art. The latter example is schematically illustrated in FIG. 2A, where the first group of electrodes (between at least two of which the voltage is applied) is defined by the plurality of metallic pipes 210 (the only one of which is shown as 130 in FIG. 1A), configured to deliver steam to the underground region of interest impregnated with oil, while the second group of receiving electrodes includes an array of point electrodes (shown, for simplicity, as a linear array 220) extending along a line representing the extent of a pipe 210. Notably, the electrical calculations performed according to the idea of the invention are not necessarily based on the assumption that each receiving electrode is a point electrode—that is, the relative dimensions of the receiving electrodes can be taken into account. Thus, it is understood that appropriate adjustments may be required to account for spatial distributions of voltage among the receiving (sensing) electrodes when sizable (i.e. non-point) electrodes are used, such as long rods or existing well casings for example.

Generally, the array of receiving electrodes may include a two-dimensional array of operably-connected electrodes, as shown in plain view in FIG. 2B, for example. In this specific case, twelve point receiving electrodes or sensors 230A, 230B form a 2D-array configured radially with respect to the centrally-located site 240 of fluid injection occurring through a 6-inch diameter steel casing towards a reservoir at about 180 m depth underground. Each electrode is sequentially paired with a single remote surface electrode (shown in FIG. 2B as RE) for reference. The inner-level sensors 230A are positioned at a distance of about 30 meters from the injection casing 240 (configured as a transmitting electrode to directly energize only the fluid being injected), while the outer-level sensors 230B are disposed at about 60 m distance from the site 240. Some of the individual electrodes are labelled A, B, D, E, and F.

In field practice—while pre-specified locations for sensing electrode(s) may be desirable—the circumstances may require the use of existing infrastructure (e.g. RMOTC where existing wells had to be used) as a sensing electrode, for example.

The following illustrations are applicable to the situation where injection wells are in a saturated zone (below water table), and, for example, there is already interstitial water in the hosting media as well as ground water and, in the special case of SAGD, oil. When the injection well is electrified, steam goes into the well/ground, water is electrified, steam expands and creates a high ionic strength front that moves with the oil and steam away from the original location.

Before the injection of fluid at the site 240, the background or reference distribution of electric field is detected with the underground and-or surface sensors 230A, 230B, as shown in FIG. 3A. The observed spatial asymmetry of the distribution 300 is caused by the subsurface anisotropy and/or deviation of the injecting well 240 from being vertical and/or linear.

The electric field distribution 310, measured with the arrays 230A, 230B as a result of injecting about 7,000 gallons of fluid at the site 240, is shown in FIG. 3B. From the comparison of the contour plots 300, 310 it is notable that in this specific case the anisotropy of the E-field distribution remains, the inner contours contract and the outer contours expand, thereby providing an indication of how the injected fluid is entering the formation.

The plots 320 FIG. 3C illustrate the changes in the distribution of the E-filed that occurred after the fluid was injected, and represents a map of difference between the maps of FIGS. 3B and 3A. The center of the distribution shifts from the location of the site 240 along the flow or movement vector 330; the anisotropy of the distribution and, by implication, the related flow direction are qualitatively demonstrated. In addition, it is noteworthy to observe the direction/s in which flow is either not taking place or is occurring at lower rates than that of vector 330. Understandably, it is the parameters of the vector 330 that embodiments of the invention allow to determine in real time.

The time series are truncated at the time the fluid-front makes physical contact with the respective sensor electrode. FIG. 4A shows the E-field characteristics in the one chosen direction from the injection well (the northerly direction in this specific case), while FIG. 4B shows these characteristics in another direction (here, in the westerly direction). As observed, the flow rates in these two directions are substantially different.

In more detail, and in reference to FIGS. 1A and 2B, for example, FIGS. 4A and 4B contain the plurality of plots representing the changes in spatial distribution of electrical signal(s) acquired by the observation wells in response to the propagation of the Gaussian surface of electrical charges associated with the volume of the electrified liquefied material underground. Here, plots A, B, and C of FIG. 4A illustrate the results of measurement of the E-field corresponding to the Gaussian surface of electric charges associated with the expanding volume of liquefied-and-energized material moving from the location of injection towards and across three observation wells or electrodes A, B, and C. Traces A, B and C are the time series data collected for three observation wells at regularly increasing distances (25, 50 & 75 feet), respectively, from an injection well. FIG. 4A shows the E-field characteristics in the one chosen direction from the injection well (the northerly direction in this specific case), while FIG. 4B shows these characteristics in another direction (here, in the westerly direction). As observed, the flow rates in these two directions are substantially different. During the measurement, these electrodes were disposed approximately along a straight line but at different separations from the location P to generate real-time data representing the correspondingly increasing value of electric field at a corresponding electrode. (Note, that the electrode C is not shown in FIG. 2B).

The level of electric field shown as "background" is defined as the observed E-field potentials at the respective observation wells prior to injection. The time dependence can be determined from the location of the 1/e value, or, alternatively, the inflection point of the sigmoidal curve. In the case of FIG. 4A the 1/e values for the predictive model curves are 3.3, 6.9 and 15.1 minutes, respectively, and for the inflection points. This progressive increase in time reflects the same progressive increase in time of arrival of the wetting front at the respective electrode. Two of the three time series are "truncated" where the wetting front (fluid front) has contacted the electrode (left and middle traces A, B). The wetting front represented by the third (rightmost) trace C never contacted the third electrode and simply languished at a new "background" level representative of the change in fluid volume due to the injection. The 1/e values can be linearly correlated to measured arrival times of the wetting front (confirmed by drastic changes in the time series which are truncated in this presentation).

In comparison, FIG. 4B presents the results of the measurement of the electric field, produced by the expanding and/or moving volume of the liquefied-and-energized fluid underground, with a group of different electrodes D, E, and F of FIG. 2B that are disposed around the injection well (P, 240 in the example of FIG. 1A) and separated from it by an approximately the same distance. It is evident that the E-field changes more rapidly in the westerly direction as shown in FIG. 4B compared to the flow in the northerly direction shown in FIG. 4A. In this manner, the above mentioned anisotropy is displayed in a different manner. The rates at which the E-field arrives at the various distances can be quantitatively converted into fluid flow velocities and directions. Notice the much closer traces of the time series to each other and their location to the left of those in FIG. 4A; i.e. at an earlier time. Again, the 1/e values can be correlated with the physical arrival times of the wetting front and it is obvious that the wetting front travels faster in the westerly direction (FIG. 4B) than in the northerly direction (FIG. 4A). In this manner, flow anisotropy, at least in two directions, can be determined quantitatively. With additional electrodes surrounding the injection well a more refined direction control can be obtained.

FIG. 5 contains plots of data acquired with the use of a related methodology and associated with electrical potential next to steel well casings. The plots represent the empirically observed transfer resistances at buried electrodes alongside steel casings. The black line "a" on the left side of the plot represents the position of the steel casings (all of the same length), while the various colored dots (i, ii, iii, etc.) represent the depths of the ERT electrodes and the measured transfer resistances at those electrodes when the steel casings were energized. These data show for a fluid contaminated zone at depths ranging from 20 to 30 meters (roughly) that the transfer resistance varies dramatically, contrary to the conventional thinking that the potential distribution and current densities along a metallic casing are uniform. These data are also static, i.e. not time dependent (dynamic) but they show that the E-field preferentially tracks areas or zones possessing electrical conductivity zones rather than being uniform along the casings. As shown, the responses are normalized to distance between the electrodes and the casings.

A person of skill in the art will readily appreciate that— while not shown in the Figures—processing of electrical signals acquired with the system of the invention is carried out with a programmable computer processor as follows. After time-series of the transfer-resistance signals have been acquired during the measurement in a form of a time-series data points for each of sensors (sensing electrodes), these time-series of data may be grouped according to the geometry of the sensor(s) (i.e. point electrode, linear electrode, or sensor of a complex shape) and processed in parallel. As with many time-series, a certain amount of preprocessing may be required to eliminate various noise data represented by spikes or unrelated data excursions due to any number of external influences (e.g. precipitation, broken connections, disruptions, lightning, etc.) that would otherwise complicate or at least interfere with subsequent statistics and calculations. Once the data have been "sanitized" they are subjected to the following processing algorithm:

If necessary, smooth the transfer-resistance time-series using appropriate filtering methods to minimize small statistical scatter but not distort the desired signal.

Convert the transfer-resistance time-series to seconds (for short time testing) or minutes, hours, days (for longer term testing) relative to the start time of an injection, leak, or slug.

If the test consists of multiple injections then an ensemble averaging and stacking of the resultant data may be required.

Additionally, if the test consists of limited time injections then two evaluations can be performed; one during the injection period and another during the recovery period. Both stages are subjected to the same treatment but with a probable sign change for one of the stages.

If the test is a long-term injection then single time-series can be evaluated.

Through either visual fitting or model fitting, estimate an asymptotic starting value of transfer-resistance. This can also be determined through "background" (i.e. pre-injection) measurements of transfer-resistance.

Estimate the terminal value, if the voltage appears asymptotic to some value at later time.

It is not absolutely necessary but as a matter of convenience, normalize the transfer-resistance time-series to the starting value so that the changes in transfer-resistance are relative to 1.0.

If necessary, adjust the sign of the transfer-resistance such that the values will decrease with increasing time. Care must be taken to observe if the sign behavior is due to an arbitrary choice of sign or as a function of the sensor geometry (another previously undisclosed characteristic of the invention).

If necessary or desired for convenience, a lower limit to the transfer-resistance may also be estimated through visual or model estimation. This will bracket the transfer-resistance between 1.0 (starting value) and 0.0 (terminal value).

Fit the results to a first order approximation with a negative exponential function of the fundamental sigmoidal form d=a*e^(-t/f) where a is an amplitude-scaling factor, t is the elapsed time since the onset of injection, and f is a time-shifting factor.

Notably, numerous sigmoidal functions may be fit to the data as long as they pertain or conform to the pre-described starting and terminal values. The common factor between them is the point at which the sigmoidal function reaches its 1/e value. Through standard nomenclature the 1/e value is commonly understood to represent the fundamental or aggregate time constant of the system.

This approach to determining the time constant of the change in the electric field is independent of well parameters and applies equally to the dynamic behavior of injections or recovery.

A short time-constant indicates rapid movement towards a given sensor. A longer time-constant indicates lack of movement in the direction of the respective sensor. Determination of time constants in the manner described above at each sensor location surrounding the injection will leads to a two-dimensional determination of anisotropy of fluid flow in the subsurface space (underground).

Additionally, if sensors are vertically arranged to bracket the depth of the injection the sign of the time series relative to its vertical position will allow determination of the level at which flow is taking place, which is not necessarily at the injection level. A person of skill will readily appreciate that a three-axis anisotropy of the results of the measurement (or, put differently, a 3D mapping of the fluid flow) may be derived with the use of a combination of surrounding laterally and vertically disposed sensors. Additionally, with the knowledge of the injection volume a pseudo-flow-volume can be modeled from the three-axis data.

An important point is that by measuring the transfer-resistance of the E-field the direction and rate of propagation of the electrified fluid is detected the instant the injection commences. In stark contradistinction with methodologies of related art, there is no requirement that the fluid physically reach a given sensor in order to be detected.

In addition or alternatively, when the sensor or electrode geometry allows to do so, the behavior of the dynamic E-field can be modeled parametrically. For the first-order quantification of EHD, assumptions regarding idealization of parameters and boundary conditions are as follows.

The first-order approximation of EHD assumes equivalence between certain hydrologic parameters and E-field characteristics. The hydrologic or hydraulic parameters either assumed or known are injected fluid volume, injected fluid flow rate, uncompressible fluid, static initial conditions, isotropic and homogeneous aquifer, fixed and constant aquifer thickness (i.e. vertical aquifer confinement), and infinite lateral extent of the aquifer (i.e. unconfined lateral boundaries).

In the general case the flux p emanating from a point source or, alternatively, converging to a point sink, is well understood through potential theory to follow Laplace's equation in spherical coordinates (r, θ, x)

$$\nabla^2 \varphi = \frac{1}{r^2}\frac{\partial}{\partial r}\left(r^2\frac{\partial \varphi}{\partial r}\right) + \frac{1}{r^2\sin(\theta)}\frac{\partial}{\partial \theta}\left(\sin\theta\frac{\partial \varphi}{\partial \theta}\right) + \frac{1}{r^2\sin^2\theta}\frac{\partial^2 \varphi}{\partial x^2} = 0$$

which, given a uniform flow field in a homogeneous isotropic space and normalizing to the origin, conveniently reduces to $$\frac{1}{r^2}\frac{\partial}{\partial r}\left(r^2\frac{\partial \varphi}{\partial r}\right) = 0$$

It is well understood that at two different distances (a and b) from the point source or sink $$\varphi_a = -\frac{constant_1}{r_a} + constant_2 \text{ and } \varphi_b = -\frac{constant_1}{r_b} + constant_2$$

This implies that p varies inversely with distance from the point source and is proportional to the potential difference $\phi_a - \phi_b$ between the two enclosing spherical boundaries at distances a and b. Regardless of whether we speak of hydraulics, heat or electrostatics the same potential functions apply (within the normal assumptions).

The total flow through the spherical surface is $$Q = -\int_0^{2\pi}dx\int_0^{\pi}r^2\sin\varphi v_r d\theta = \frac{4\pi(\varphi_a - \varphi_b)}{\frac{1}{r_a} - \frac{1}{r_b}}$$

where $$v_r = -\frac{\partial \varphi}{\partial r} = \frac{\varphi_a - \varphi_b}{\frac{1}{r_a} - \frac{1}{r_b}} \frac{1}{r^2}$$

and is the vector rate of change of potential whether it is the conceptual flow rate of fluid to or from a point source/sink at the origin or the difference in potential due to a point charge at the origin. Q represents the total flux through a spherical surface and also represents the total charge distributed over the surface which is also referred to as a Gaussian surface.

The foregoing define steady state conditions and isotropic flow in three dimensions. Narrowing the concept to two-dimensionality, which ostensibly represents the behavior of most reservoirs and aquifers where fluid flow from or to a well is ideally radial, Laplace's equation in cylindrical coordinates (r, θ) is $$\nabla^2 \varphi = \frac{1}{r}\frac{\partial}{\partial r}\left(r\frac{\partial \varphi}{\partial r}\right) + \frac{1}{r^2}\frac{\partial^2 \varphi}{\partial \theta^2} + \frac{\partial^2 \varphi}{\partial z^2} = 0$$

A common form of complete solution for Laplace's equation is $$\varphi(r,z) = e^{\pm ikz} \cdot Z_m(ikr) \cdot (\alpha \cos m\phi + \beta \sin m\phi)$$

where $Z_m(ikr)$ is a cylinder function, k, a, (and m are arbitrary constants. The real part of the solution allows for increasing amplitude oscillatory behavior (positive exponential) for continuous injections (constant head, constant pressure, increasing volume, etc.) and decreasing oscillatory behavior (negative exponential) for pulsed injections (slug tests, cyclic injections, finite volume, etc.). Countless examples exist in the hydrologic literature using such solutions to describe various types of well testing and reservoir engineering. However, those pertain only to hydraulic behavior.

Additional examples of negative exponential hydraulic behavior can be in related art found for breakthrough curves, diffusion, and thermal behavior. Electrifying solutions that are injected into the subsurface create an electric field that under the appropriate circumstances also behaves following a negative exponential. However, various different phenomena that cause the negative exponential behavior are typically coupled and are difficult to separate or isolate. The end result is that the electric field behavior is a summation of the behaviors of the various phenomena as $$f(E(t)) = \alpha_0 + \sum_{n=1}^{\infty} \gamma_n e^{-\beta_n t_n}$$

where α, β, and γ are coefficients related to the various behavior components. There is empirical evidence for the presence of a sinusoidal component but for the majority of behaviors observed in testing it is a minor effect that is neglected in the first order approximation. Although the components are generally inseparable parameterization of the summation of negative exponentials allows the cumulative effects to be quantified. Graphically this solution produces plots with some common characteristics: 1. a sigmoidal shape; 2. an initial limiting asymptote; 3. a terminal asymptote; and 4. a decay rate.

It is appreciated that, in powering the electrodes of the arrays of electrodes, the same potential can be applied to many electrodes, not one.

The advantages of the implementation(s) of the present invention manifest in the ability to determine various functional parameters and/or dynamic characteristics characterizing and/or relating to the fluid flow (such as, for example, permeability, flow velocity, fracture aperture, and complexity and diffusivity), each and all of which are important for characterization of the reservoir. Unless indicated otherwise, the term "reservoir" is used to denote a body of underground liquid or gas, whether as an aquifer, an oil-saturated formation or in the form of ground impregnated with oil. The determination of such functional parameters is implemented by the system in real time. For the purposes of this disclosure and accompanying claims, a real-time performance of a system is understood as performance which is subject to operational deadlines from a given event to a system's response to that event.

Notably, the implementation(s) of the idea of the invention described below cannot be qualified, by a person of ordinary skill in the art, as method(s) relying or based on resistivity measurements. The resistivity-based methodologies are well-known to require a knowledge of (or an assumption about) geometry and/or a volume of ground (earth) in which the sought-after fluid is present and which is being measured. The resistivity-based measurement of the fluid characteristic result in determination of what's referred to as "true", "apparent", or "inverted" or modeled" resistivity parameter. In contradistinction, the present methodology relies only on temporal observations of the electric field associated with the underground fluid and does not imply or require any knowledge of the ground volume or calculation of resistivity parameter(s). Stated differently, the described approach is devoid of knowledge of resistivity of the medium of the reservoir itself or that surrounding the reservoir. Furthermore, implementation(s) of the idea of the invention do not require the presence of any acoustic signal or disturbance associated with the movement of liquefied and electrically energized material underground. Accordingly, a method of the invention is devoid of the measurement and/or other use of such acoustic signal and/or disturbance.

Similarly, and in contradistinction with the idea presented by Fink in U.S. Pat. No. 7,141,982 (which turns on the injection of electrical current in the vicinity of a necessarily-liquid containment facility of interest to create a measurable electrical potential field in the ground underlying the site, and which is devoid of energizing the underground fluid by directly supplying the electrical current to it), the solution of the problem provided by the present invention requires the direct electrification of the underground fluid and the measurement of changes of electrical parameters of a surface formed by electrical charges formed at such fluid.

It is appreciated that some of the steps of the embodiments of the method of the invention can be effectuated with a processor controlled by instructions stored in a tangible, non-transitory storage memory. The memory may be random access memory (RAM), read-only memory (ROM), flash memory or any other memory, or combination thereof, suitable for storing control software or other instructions and data. Some of the functions performed by the processor have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. For example, FIG. 6 illustrates schematically a situation when the method of the invention is carried out by forming the spatial distribution of electric potentials in an underground medium by injecting current through a member 610$i$ of the array 610 of electrodes in contact with the ground and measuring the change in such spatial distribution with another member of the same array, to determine (prior to an actual arrival of the underground medium to a target location) a time of such arrival. In the specific case of FIG. 6. the array 610 of electrodes is shown as an array disposed underground. Disclosed aspects, or portions of these aspects, may be combined in ways not listed above. Accordingly, the invention should not be viewed as being limited to the disclosed embodiment(s).

What is claimed is:

1. A method for determining a dynamic characteristic of fluid, the method comprising:
   choosing a reference electrically-conducting member disposed in electrical contact with a ground;
   identifying a target location at the ground, the target location separated from the reference electrically-conducting member;
   determining a spatial coordination between said reference electrically-conducting member and a first array of electrically-conducting members each of which is disposed in electrical contact with the ground;
   injecting current, into an ambient medium surrounding the reference electricallyconducting member, through the reference electrically-conducting member to form a spatial distribution of electric potentials in said ambient medium; and measuring a time-dependent change of said spatial distribution, occurring due to a movement of the ambient medium, with at least one electrically-conducting member of said first array of electrically-conductive members to determine a time of an actual arrival of said ambient medium to the target location prior to said actual arrival.

2. A method according to claim 1, wherein said measuring includes measuring said time-dependent change with the at least one electrically-conducting member of the first array that includes an array of electrically-conductive members disposed underground.

3. A method according to claim 2, further comprising choosing a surface electrode disposed remotely from the first array; and
sequentially electrically pairing each electrically-conducting member of the first array with said surface electrode.

4. A method according to claim 1, wherein said measuring includes measuring said time-dependent change with said first array that includes an array of point electrically-conducting members distributed at the ground surface.

5. A method according to claim 1, wherein a combination of said choosing and said determining includes disposing an electrically-conducting member under and substantially parallel to a ground surface.

6. A method according to claim 1, wherein said method is devoid of measuring a resistivity of the ground.

7. A method according to claim 1, further comprising forming a visually-perceivable spatial map of said movement as a function of time.

8. A method according to claim 7, wherein said forming includes forming said map within a mapping timer period that is a sub-set of an operational time period, the operational time period ranging from a first time to a second time, the first time being time preceding said injecting, the second time being time of said actual arrival.

9. A method according to claim 1, wherein said measuring including measuring a voltage between any two electrically-conducting members in a first pair from said first array.

10. A method according to claim 9, further comprising:
electrically deactivating any of said two electrically-conducting members in said first pair to define an electrically-deactivated member, and
measuring a voltage between electrically-conducting members in a second pair from said first array, said second pair not including said electrically-deactivated member.

11. A method according to claim 1, further comprising delivering a fluid underground to form said ambient medium, and
wherein said measuring includes measuring a voltage between any two electrically-conducting members of the first array while said fluid is in physical contact with said reference electrically-conducting member.

12. A method according to claim 1, wherein said measuring includes measuring a change of a Gaussian surface of electrical charges that has been formed in liquefied and energized material associated with said ambient medium.

13. A method according to claim 1, further comprising acquiring electrical signals from electrically-conducting members of the first array at a sampling rate sufficient to identify, in real time, said time-dependent change.

14. A method for determining a dynamic characteristic of fluid, the method comprising:
disposing a first array of electrically-conducting members in electrical contact with the ground;
identifying a target location at the ground, the target location separated from the first array;
injecting current, into an ambient medium surrounding a first electrically-conducting member chosen from the first array through said first electrically-conducting member to form a first spatial distribution of electric potentials at said ambient medium; and
measuring a time-dependent change of said first spatial distribution, occurring due to a movement of said ambient medium, with a sensing electrically-conducting member chosen from said first array to determine, prior to an actual arrival of said ambient medium to the target location, a time of said arrival.

15. A method according to claim 14, wherein said measuring includes measuring a voltage between any two electrically-conducting members in a first pair from said first array, said first pair not including the first member.

16. A method according to claim 14, further comprising:
electrically deactivating any of said two electrically-conducting members in said first pair to define an electrically-deactivated member, and
measuring a voltage between electrically-conducting members in a second pair from said first array, said second pair not including said electrically-deactivated member.

17. A method according to claim 14, further comprising electrically-deactivating said first electrically-conducting member;
injecting current, into said ambient medium surrounding a second electrically-conducting member of the first array, through said second member to form a second spatial distribution of electric potentials at said ambient medium; and
measuring a time-dependent change of said second spatial distribution, occurring due to the movement of said ambient medium, by measuring a voltage between any two electrically-conducting members from said first array, said any two members not including the second member.

18. A method according to claim 14, further comprising delivering a fluid underground to form said ambient medium, and
wherein said measuring includes measuring a change of a Gaussian surface of electrical charges, that, has been formed in liquefied and energized material associated with said ambient medium, by measuring a voltage between any two electrically-conducting members of the first array.

19. A method according to claim 18, further comprising:
electrically deactivating any of said two electrically-conducting members of the first array to define an electrically-deactivated member, and
measuring a voltage between another pair of electrically-conducting members from said first array, said another pair not including the electrically-deactivated member.

20. A method according to claim 14, further comprising forming a visually-perceivable spatial map of said movement as a function of time.

* * * * *